US012780069B2

(12) United States Patent
Bi et al.

(10) Patent No.: US 12,780,069 B2
(45) Date of Patent: Nov. 3, 2026

(54) SEAT ASSEMBLY INCLUDING LEG REST

(71) Applicant: GM GLOBAL TECHNOLOGY OPERATIONS LLC, Detroit, MI (US)

(72) Inventors: Zhen Bi, Shanghai (CN); Damiano Marco Gianchino, Berwick (AU)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 115 days.

(21) Appl. No.: 18/802,778

(22) Filed: Aug. 13, 2024

(65) Prior Publication Data

US 2026/0008395 A1 Jan. 8, 2026

(30) Foreign Application Priority Data

Jul. 5, 2024 (CN) ......................... 202410905731.4

(51) Int. Cl.
*B60N 2/90* (2018.01)

(52) U.S. Cl.
CPC .................................... *B60N 2/995* (2018.02)

(58) Field of Classification Search
CPC .... B60N 2/995; B60N 2/3077; B60N 2/3009; B60N 2/3011; B60N 2/3013; B60N 2/3059; B60N 2002/126; B60N 2/02253; B60N 2/02258; B60N 2/20
See application file for complete search history.

(56) References Cited

U.S. PATENT DOCUMENTS 2,824,599 A 2/1958 Quinlan
3,761,124 A * 9/1973 Weik .................... B60N 2/7029 297/423.15
5,740,989 A * 4/1998 Daines ............... B64D 11/0641 297/65
8,936,214 B2 * 1/2015 Foucher ............. B64D 11/0601 297/65
10,688,894 B2 * 6/2020 Nevarez .................... B60N 3/06
11,097,846 B2 * 8/2021 Madrigal ........... B64D 11/0643
11,613,359 B2 * 3/2023 Dowty ............... B64D 11/0601 244/118.6
2004/0051003 A1 * 3/2004 Cheung .................. B64D 11/06 244/118.6
2014/0132040 A1 * 5/2014 Arakawa .............. B60N 2/6009 297/112

(Continued)

FOREIGN PATENT DOCUMENTS

DE 102006015795 A1 10/2007
DE 102012019184 A1 4/2014
DE 102022117840 A1 1/2024

(Continued)

OTHER PUBLICATIONS

German Office Action from counterpart DE1020241245298, dated Jun. 17, 2025.

*Primary Examiner* — Chi Q Nguyen

(57) ABSTRACT

A seat assembly including: a base; a back defining an opening extending through the back; and a leg rest assembly mounted to the back, the leg rest assembly including a panel rotatable between a stowed position and a deployed position, in the stowed position the panel is within the opening, and in the deployed position the panel is rotated in a forward direction from the stowed position toward the base to expose the opening and provide a leg rest for a person's leg extending through the opening.

16 Claims, 5 Drawing Sheets

(56) References Cited

U.S. PATENT DOCUMENTS

2019/0111810 A1* 4/2019 Hoover ................ B60N 2/3045

FOREIGN PATENT DOCUMENTS

| | | | |
|---|---|---|---|
| FR | 3017833 | A1 | 8/2015 |
| JP | H0984658 | A | 3/1997 |
| JP | 2002120625 | A | 4/2002 |
| JP | 2009035152 | A | 2/2009 |
| KR | 20160013405 | A | 2/2016 |
| KR | 101634971 | B1 | 7/2016 |
| WO | WO-0013931 | A1 | 3/2000 |
| WO | WO-2013094342 | A1 | 6/2013 |

* cited by examiner

SEAT ASSEMBLY INCLUDING LEG REST

CROSS-REFERENCE TO RELATED APPLICATIONS

This application claims the benefit of Chinese Patent Application No. 202410905731.4 filed on Jul. 5, 2024. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a seat assembly including a leg rest.

Vehicles typically include multiple rows of seats. For example, a rear seat will be behind a forward seat, which may be a front seat or an intermediate seat. Occupants of a rear seat are typically prevented from fully extending their legs due to the presence of the forward seat.

SUMMARY

The present disclosure includes, in various features, the following: a seat assembly including: a base; a back defining an opening extending through the back; and a leg rest assembly mounted to the back, the leg rest assembly including a panel rotatable between a stowed position and a deployed position, in the stowed position the panel is within the opening, and in the deployed position the panel is rotated in a forward direction from the stowed position toward the base to expose the opening and provide a leg rest for a person's leg extending through the opening.

In further features, the seat assembly is configured as an automobile assembly.

In further features, in the deployed position a bottom surface of the panel faces the base and a top surface of the panel is configured to support the person's leg.

In further features, the leg rest assembly includes: a first bracket and a second bracket mounted to the back; and a support member mounted to the first bracket and the second bracket, the panel is rotatably mounted to the support member.

In further features, the support member is a rod extending between the first bracket and the second bracket.

In further features, a hinge mounts the panel to the support member.

In further features, the hinge includes a first portion mounted to the support member and a second portion mounted to the panel, the second portion extends from the first portion at an angle.

In further features, a tab extends from the hinge; and a track is defined by the first bracket. The track is curved between a first end and a second end of the track. The tab is in cooperation with the track and movable within the track between the first end and the second end of the track. In the stowed position, the tab is at the first end of the track and in the deployed position the tab is at the second end of the track. Cooperation between the tab and the track limits rotation of the panel.

In further features, cooperation between the tab and the track restricts rotation of the panel out from within the opening in a rearward direction opposition to the forward direction.

In further features, an entirety of the track is within a width of a frame of the back.

In further features, an entirety of the track is within the opening defined by the back.

The present disclosure further includes, in various features, a seat assembly including: a base; a back extending from the base, the back including a frame defining an opening; and a panel rotatable about a hinge mounted to the frame, the panel rotatable between a stowed position and a deployed position, in the stowed position the panel is within the opening, and in the deployed position the panel is over the base to uncover the opening and provide a foot rest for a person seated behind the seat assembly with their leg extending through the opening. The seat assembly is configured as an automobile seat assembly.

In further features, the panel is mounted to a rod with the hinge. The rod is mounted to the frame with a bracket defining a curved track. A tab extends from the hinge into cooperation with the curved track, the tab moves along the curved track as the panel is moved between the stowed position and the deployed position, cooperation between the tab and the curved track prevents over rotation of the panel beyond the stowed position and the deployed position.

The present disclosure also includes, in various features, a seat assembly including: a base; a back extending from the base and defining an opening extending through the back; and a leg rest assembly mounted to the back with a bracket defining a track, the leg rest assembly including a panel rotatable on a hinge to a stowed position within the back and to a deployed position above the base, a tab extends from the hinge into cooperation with the track. The tab moves along the track as the panel is moved between the stowed position and the deployed position, cooperation between tab and the track prevents over rotation of the panel beyond the stowed position and beyond the deployed position.

In further features, the seat assembly is configured as an automobile seat assembly.

In further features, the bracket is a first bracket mounted to a frame of the back, the leg rest assembly further including a second bracket mounted to an opposite side of the frame; the leg rest assembly further including a rod rotatably mounted to the first bracket and the second bracket; and a hinge connects the panel to the rod.

In further features, the hinge includes a first portion and a second portion at a 90° angle to the first portion.

In further features, the track is curved.

In further features, the track includes a first end that is lower than a second end, in the stowed position the tab is at the first end, and in the deployed position the tab is at the second end.

In further features, rotation of the panel to the deployed position from the stowed position is rotation in a forward direction towards the base.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure includes a seat assembly, such as for an automobile.

The seat assembly may be configured for installation in any suitable non-automotive application as well. The seat assembly generally includes a base and a back. Mounted in the back is a leg rest assembly. The leg rest assembly is rotatable between a stowed position and a deployed position. In the stowed position, a panel of the leg rest assembly is seated within an opening defined by the back of the seat to effectively close the opening. To use the leg rest assembly, the panel is rotated forward out from within the opening to the deployed position. In the deployed position, the opening is opened and the panel is arranged over the base of the seat. Thus, in the deployed position, a person seated behind the seat assembly may insert his or her leg through the opening and rest his or her leg on the panel. The seat assembly of the present disclosure enhances passenger comfort and improves the overall riding experience for passengers.

Figure 1:
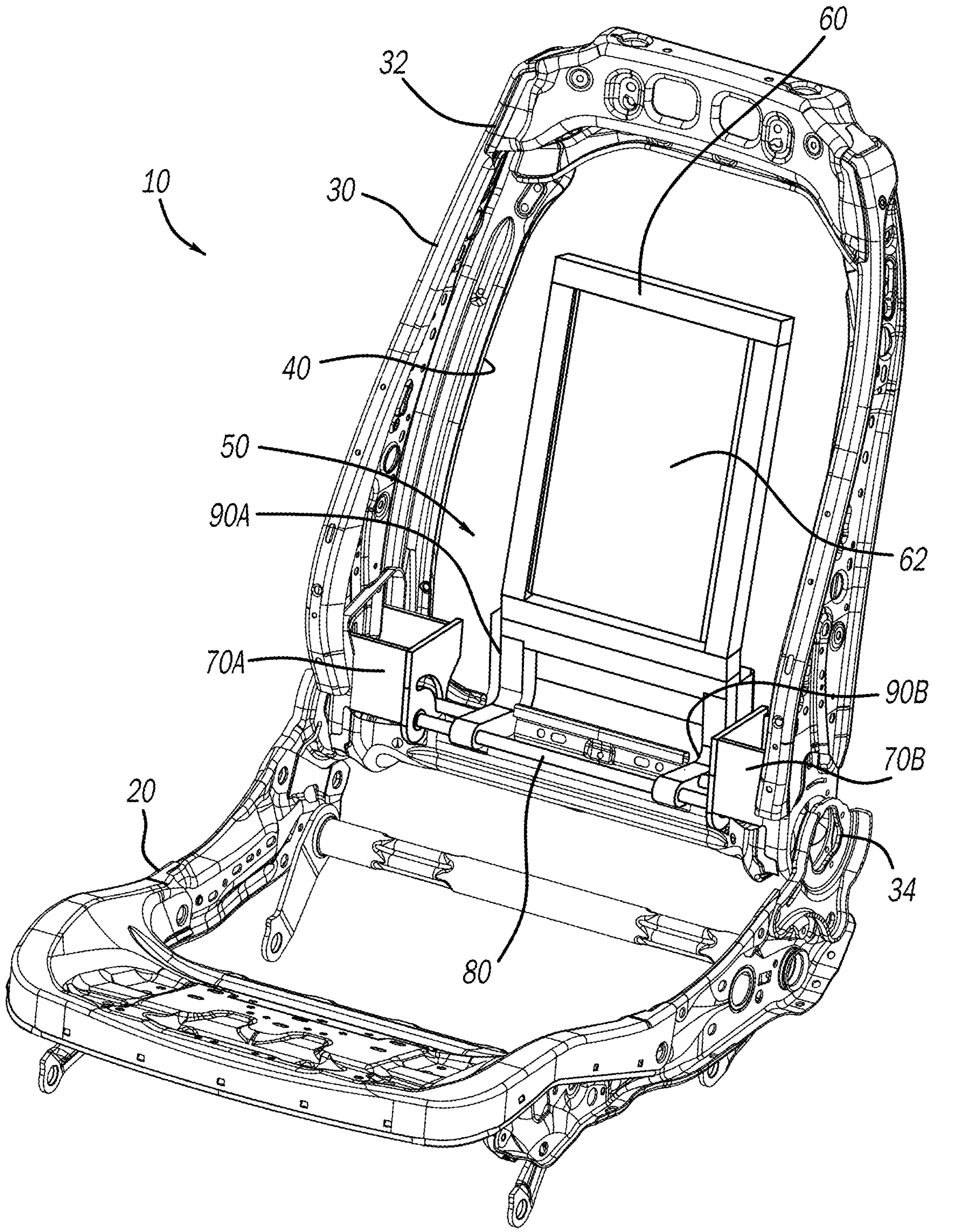
FIG. 1 is a perspective view of a seat assembly in accordance with the present disclosure including a leg rest assembly with a leg rest panel in a stowed position.
Figure 2:
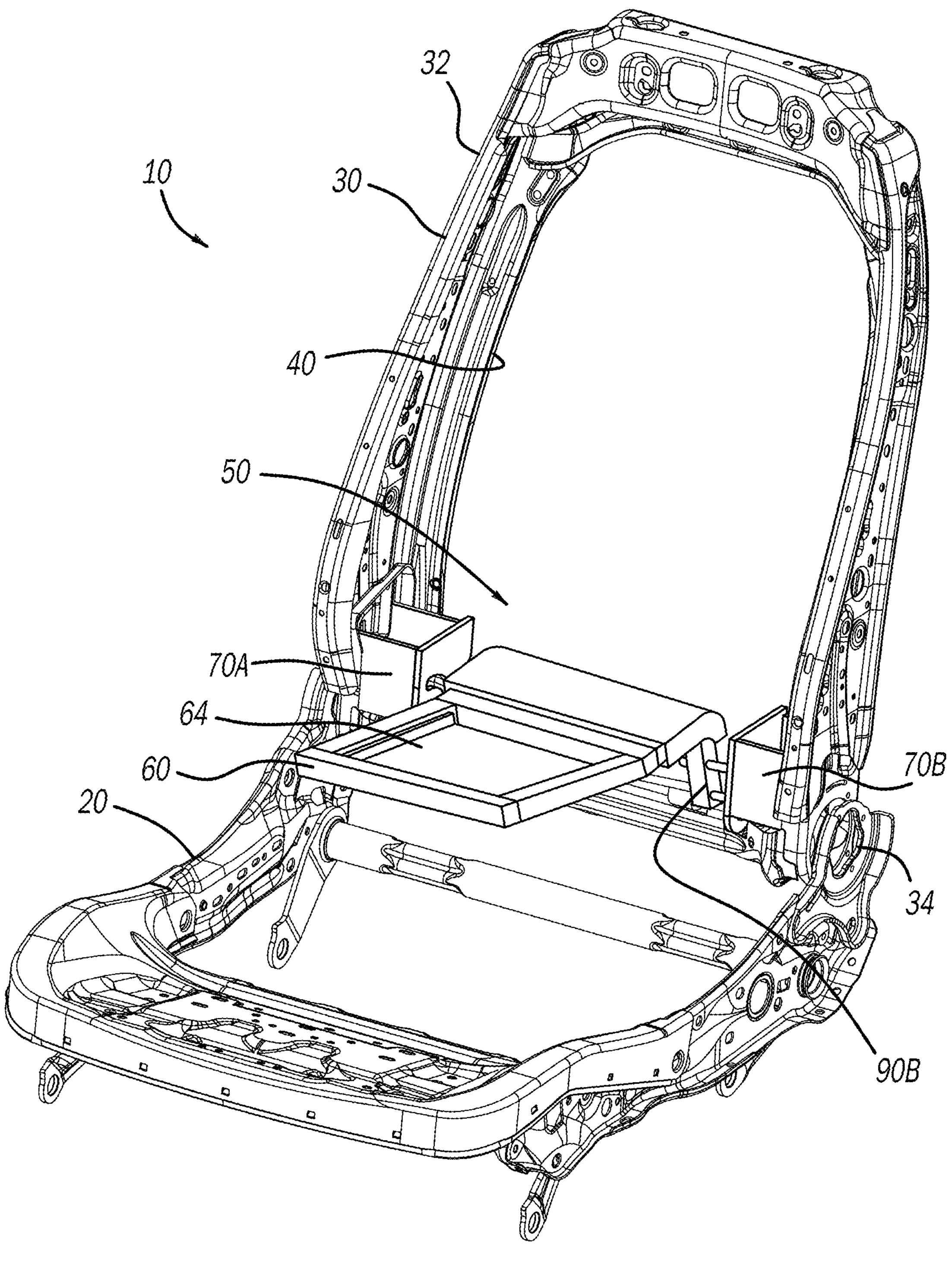
FIG. 2 is a perspective view of the seat assembly of FIG. 1 illustrating the leg rest panel in a deployed position.

With initial reference to FIGS. 1 and 2, an exemplary seat assembly 10 in accordance with the present disclosure is illustrated. The seat assembly 10 may be configured as an automobile passenger seat. The seat assembly 10 may be configured as a front seat, or any rear seat to provide a leg rest for a passenger seated behind the seat assembly 10, as explained in detail herein. The seat assembly 10 may be configured for use in any suitable non-automotive application as well. For example, the seat assembly 10 may be configured as an airline seat, theater seat, stadium seat, train seat, bus seat, tram seat, etc.

The seat assembly 10 generally includes a base 20 and a back 30. The back 30 defines a frame 32. The frame 32 is mounted to the base 20 at a seat hinge 34. The frame 32 defines an opening 40. The base 20 and the frame 32 are covered in any suitable upholstery, padding, etc. to support an occupant and increase comfort of the occupant. A sub-opening within the opening 40 may be defined by upholstery covering the frame 32.

The seat assembly 10 further includes a leg rest assembly 50. The leg rest assembly 50 is mounted to the back 30, and specifically to the frame 32 thereof. The leg rest assembly 50 may be configured in a stowed position (FIG. 1) and in a deployed position (FIG. 2). The leg rest assembly 50 includes a panel 60 rotatable between the stowed position and the deployed position. The panel 60 includes a bottom surface 62 and a top surface 64. In the stowed position, the top surface 64 faces rearward and the bottom surface 62 faces forward. In the deployed position, the bottom surface 62 faces the base 20 and the top surface 64 faces upward to provide a surface on which a passenger may rest their leg. More specifically, a rear passenger seated behind the seat assembly 10 may extend their leg through the opening 40 and onto the top surface 64 of the panel 60 to rest their leg.

Figure 3:
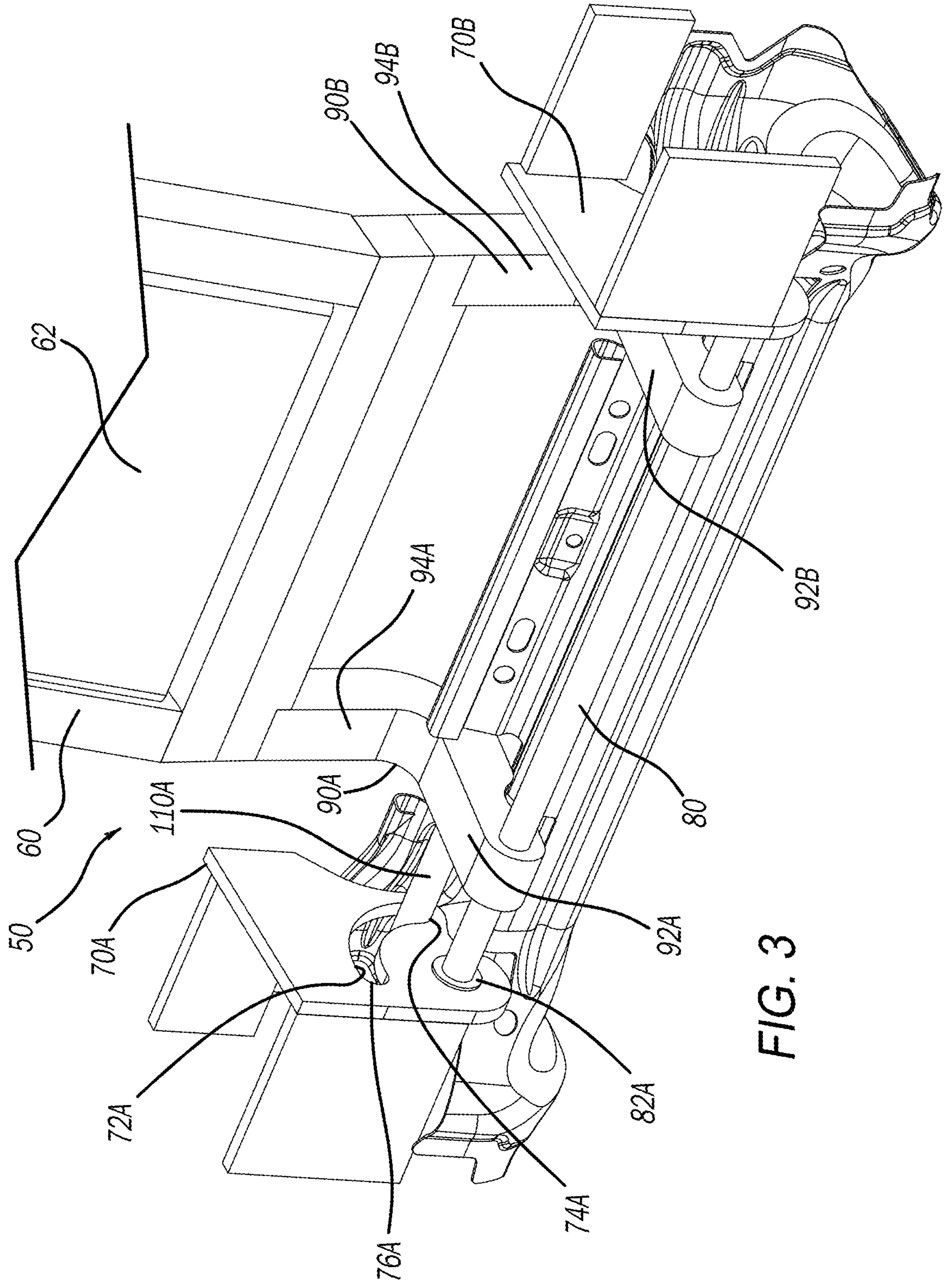
FIG. 3 is a perspective view of the leg rest assembly of FIG. 1.
Figure 4:
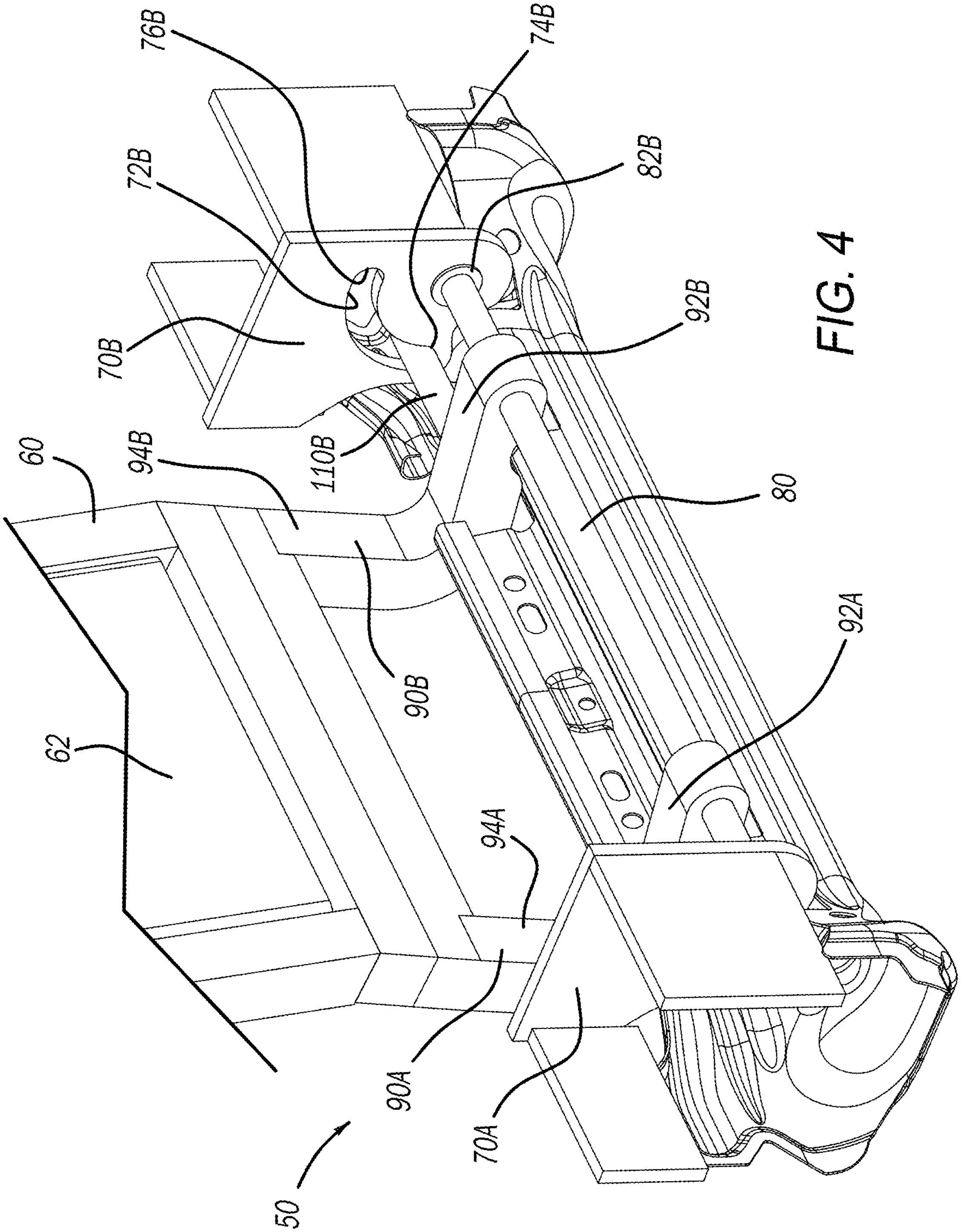
FIG. 4 is another perspective view of the leg rest assembly of FIG. 1.
Figure 5:
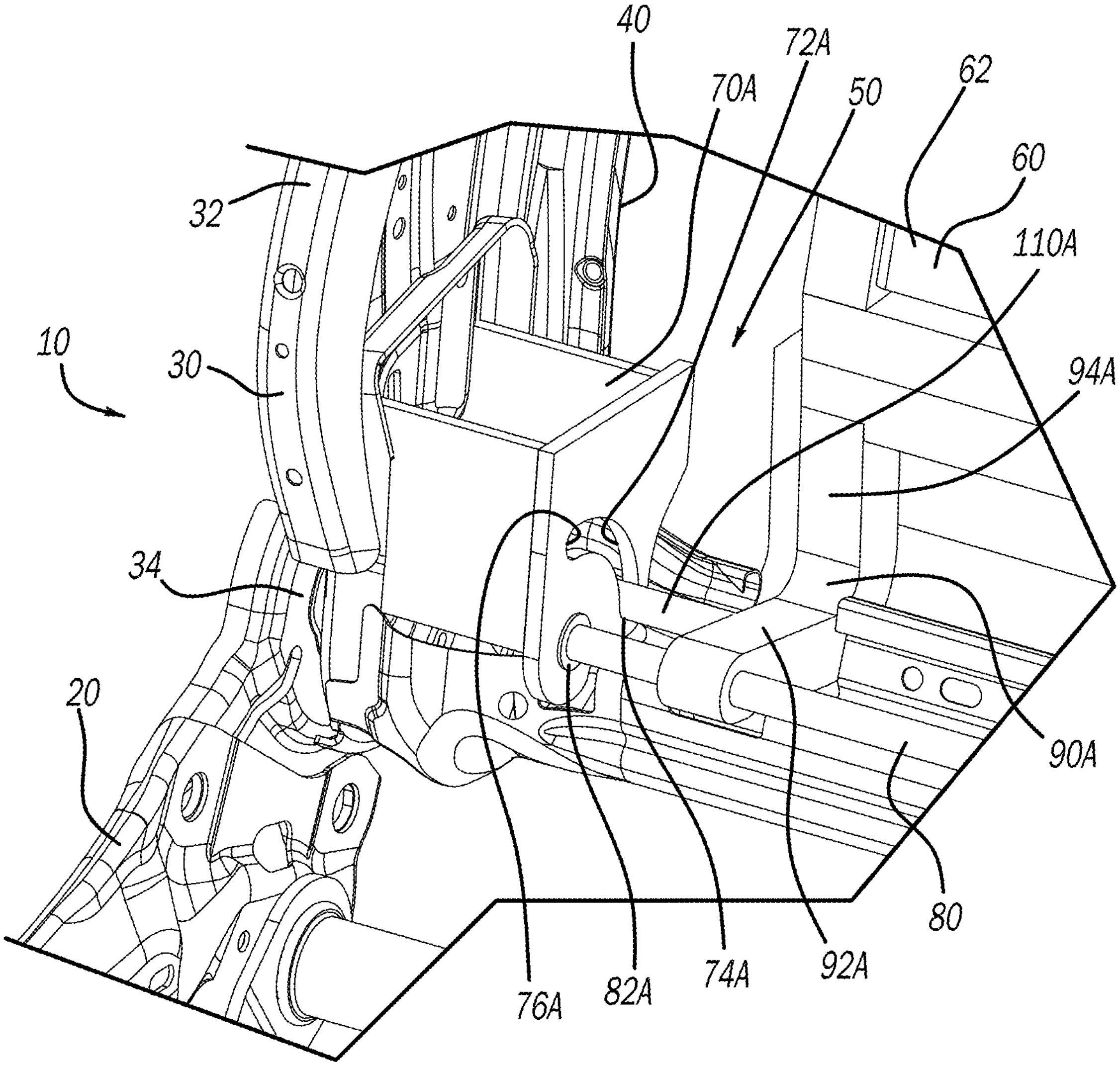
FIG. 5 is a perspective view of one end of the leg rest assembly of FIG. 1.

With continued reference to FIGS. 1 and 2, and additional reference to FIGS. 3-5, the leg rest assembly 50 will now be described further. The leg rest assembly 50 includes a first bracket 70A and a second bracket 70B. The first bracket 70A and the second bracket 70B are both mounted to the frame 32, and specifically to opposing interior surfaces of the frame 32. In the example illustrated, the first bracket 70A is mounted to an interior surface of a right side the frame 32, and the second bracket 70B is mounted to an interior surface of a left side of the frame 32. The first bracket 70A and the second bracket 70B are no wider than the frame 32 to reduce the overall profile of the leg rest assembly 50. The first bracket 70A and the second bracket 70B are the same, or generally the same.

The first bracket 70A defines a first track 72A including a first end 74A and a second end 76A. The second bracket 70B likewise includes a second track 72B, which has a first end 74B and a second end 76B. Each one of the first track 72A and the second track 72B are curved from the first ends 74A, 74B to the second ends 76A, 76B. The second ends 76A, 76B are higher than the first ends 74A, 74B. And the second ends 76A, 76B are forward of the first ends 74A, 74B, and thus closer to the base 20 and a front of the seat assembly 10. An entirety of the first track 72A and an entirety of the second track 72B is within a width of the frame 32 and within the opening 40.

The leg rest assembly 50 further includes a support member 80. In the example illustrated, the support member 80 is a rod, which is rotatable with the panel 60. A first end of the support member 80 is mounted to the first bracket 70A by way of a first bushing 82A, and a second end of the support member 80 is mounted to the second bracket 70B by way of a second bushing 82B.

The panel 60 is connected to the support member 80 by a first hinge 90A and a second hinge 90B. The first hinge 90A includes a first portion 92A and a second portion 94A. The first portion 92A is directly connected to the support member 80. The second portion 94A extends from the first portion 92A at any suitable angle, such as 90° or about 90°. The second hinge 90B includes a first portion 92B and a second portion 94B, which are arranged in a similar manner to the first portion 92A and the second portion 94A of the first hinge 90A. The first hinge 90A and the second hinge 90B are generally configured as "goose-neck" hinges. The goose-neck hinges 90A, 90B advantageously allow for maximum extension of the panel 60 in the deployed position, while allowing the panel 60 to be seated within the opening 40 and be entirely surrounded by the frame 32 in the stowed position. In the deployed position, the hinges 90A, 90B remain within the opening 40 to enhance aesthetics of the seat assembly 10.

Extending outward from the first hinge 90A toward the first bracket 70A is a first tab 110A. Extending outward from the second hinge 90B toward the second bracket 70B is a second tab 110B. The first tab 110A extends from the first hinge 90A into the first track 72A. The second tab 110B extends from the second hinge 90B into the second track 72B.

Cooperation between the first tab 110A and the first track 72A, and cooperation between the second tab 110B and the second track 72B limits rotation of the panel 60. Specifically, in the stowed position of FIGS. 1, 3, 4, and 5, the first tab 110A is at the first end 74A of the first track 72A and the second tab 110B is at the first end 74B of the second track 72B. Cooperation between the first tab 110A and the first end 74A, and cooperation between the second tab 110B and the first end 74B prevents rotation of the panel 60B beyond the stowed position illustrated. The curved shape of the first track 72A and the curved shape of the second track 72B helps to retain the first tab 110A at the first end 74A and retain the second tab 110B at the first end 74B to maintain the panel 60 upright in the stowed position.

To move the panel 60 from the stowed position to the deployed position of FIG. 2, the panel 60 is rotated forward towards the base 20. As the panel 60 is rotated forward, the first tab 110A moves along the first track 72A to the second end 76A, and the second tab 110B moves along the second track 72B to the second end 76B. Cooperation between the first tab 110A and the second end 76A, and cooperation between the second tab 110B and the second end 76B prevents rotation of the panel 60 beyond the deployed position of FIG. 2 (such as further towards the base 20). The curved shape of the first track 72A and the curved shape of the second track 72B helps to retain the first tab 110A at the second end 76A and retain the second tab 110B at the second end 76B to maintain the panel 60 in the deployed position.

In the stowed position: the bottom surface 62 of the panel 60 faces forward and is thus a front surface; and the top surface 64 faces rearward and is thus a rear surface. In the deployed position: the top surface 64 of the panel 60 is available for the passenger to rest their feet upon (such as by way of upholstery covering the top surface 64); and the bottom surface 62 faces the base 20. Thus, in the deployed position the passenger's foot (or feet) do not contact forward facing upholstery of the seat, which keeps the forward facing portion of the back 30 free from dirt that may be transferred from the passenger's feet.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A seat assembly comprising:
- a base;
- a back defining an opening extending through the back; and
- a leg rest assembly mounted to the back, the leg rest assembly including:
  - a panel rotatable between a stowed position and a deployed position, in the stowed position the panel is within the opening, and in the deployed position the panel is rotated in a forward direction from the stowed position toward the base to expose the opening and provide a leg rest for a person's leg extending through the opening;
  - a first bracket and a second bracket mounted to the back;
  - a support member mounted to the first bracket and the second bracket, the panel is rotatably mounted to the support member;
  - a hinge mounting the panel to the support member:
  - a tab extending from the hinge; and
  - a track defined by the first bracket, the track is curved between a first end and a second end of the track, the tab is in cooperation with the track and movable within the track between the first end and the second end of the track,
- wherein in the stowed position the tab is at the first end of the track and in the deployed position the tab is at the second end of the track, cooperation between the tab and the track limits rotation of the panel.

2. The seat assembly of claim 1, wherein the seat assembly is configured as an automobile assembly.

3. The seat assembly of claim 1, wherein in the deployed position a bottom surface of the panel faces the base and a top surface of the panel is configured to support the person's leg.

4. The seat assembly of claim 1, wherein the support member is a rod extending between the first bracket and the second bracket.

5. The seat assembly of claim 1, wherein the hinge includes a first portion mounted to the support member and a second portion mounted to the panel, the second portion extends from the first portion at an angle.

6. The seat assembly of claim 1, wherein cooperation between the tab and the track restricts rotation of the panel out from within the opening in a rearward direction opposition to the forward direction.

7. The seat assembly of claim 1, wherein an entirety of the track is within a width of a frame of the back.

8. The seat assembly of claim 1, wherein an entirety of the track is within the opening defined by the back.

9. A seat assembly comprising:

a base;

a back extending from the base, the back including a frame defining an opening; and a panel rotatable about a hinge mounted to the frame, the panel rotatable between a stowed position and a deployed position, in the stowed position the panel is within the opening, and in the deployed position the panel is over the base to uncover the opening and provide a foot rest for a person seated behind the seat assembly with their a leg extending through the opening, wherein:

the panel is mounted to a rod with the hinge;

the rod is mounted to the frame with a bracket defining a curved track; and a tab extends from the hinge into cooperation with the curved track, the tab moves along the curved track as the panel is moved between the stowed position and the deployed position, cooperation between the tab and the curved track prevents over rotation of the panel beyond the stowed position and the deployed position; and the seat assembly is configured as an automobile seat assembly.

10. A seat assembly comprising:

a base;

a back extending from the base and defining an opening extending through the back; and a leg rest assembly mounted to the back with a bracket defining a track, the leg rest assembly including a panel rotatable on a hinge to a stowed position within the back and to a deployed position above the base, a tab extends from the hinge into cooperation with the track, wherein the tab moves along the track as the panel is moved between the stowed position and the deployed position, cooperation between tab and the track prevents over rotation of the panel beyond the stowed position and beyond the deployed position.

11. The seat assembly of claim 10, wherein the seat assembly is configured as an automobile seat assembly.

12. The seat assembly of claim 10, wherein:

the bracket is a first bracket mounted to a frame of the back, the leg rest assembly further including a second bracket mounted to an opposite side of the frame;

the leg rest assembly further including a rod rotatably mounted to the first bracket and the second bracket; and a hinge connects the panel to the rod.

13. The seat assembly of claim 12, wherein the hinge includes a first portion and a second portion at a 90° angle to the first portion.

14. The seat assembly of claim 13, wherein the track is curved.

15. The seat assembly of claim 14, wherein the track includes a first end that is lower than a second end, in the stowed position the tab is at the first end, and in the deployed position the tab is at the second end.

16. The seat assembly of claim 15, wherein rotation of the panel to the deployed position from the stowed position is rotation in a forward direction towards the base.

* * * * *